(12) United States Patent
Lee et al.

(10) Patent No.: US 7,400,916 B2
(45) Date of Patent: Jul. 15, 2008

(54) HANDHELD MOBILE TERMINAL

(75) Inventors: Ji-Young Lee, Seoul (KR); In-Gon Park, Seoul (KR); Chang-Soo Lee, Incheon (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 11/103,157

(22) Filed: Apr. 11, 2005

(65) Prior Publication Data
US 2005/0245295 A1 Nov. 3, 2005

(30) Foreign Application Priority Data
May 3, 2004 (KR) .................. 10-2004-0031052

(51) Int. Cl.
*H04M 1/00* (2006.01)

(52) U.S. Cl. .............. 455/575.4; 455/575.1; 455/556.1; 348/374; 348/14.02

(58) Field of Classification Search .............. 455/575.4, 455/575.1, 575.3, 556.1; 348/374, 373, 14.02
See application file for complete search history.

(56) References Cited

U.S. PATENT DOCUMENTS

| | | | |
|---|---|---|---|
| 6,751,473 B1 * | 6/2004 | Goyal et al. | 455/556.1 |
| 7,002,616 B2 * | 2/2006 | Taneya et al. | 348/14.02 |
| 2004/0080667 A1 * | 4/2004 | Jeong et al. | 348/374 |
| 2004/0116166 A1 * | 6/2004 | Makishima | 455/575.1 |
| 2005/0047770 A1 * | 3/2005 | Kuchimaru | 396/75 |
| 2005/0059425 A1 * | 3/2005 | Wang et al. | 455/550.1 |
| 2006/0234786 A1 * | 10/2006 | Taniguchi et al. | 455/575.4 |

FOREIGN PATENT DOCUMENTS

| | | |
|---|---|---|
| GB | 2 389 988 | 12/2003 |
| JP | 2004-120430 | 4/2004 |

* cited by examiner

*Primary Examiner*—Danh Le
(74) *Attorney, Agent, or Firm*—The Farrell Law Firm, PC

(57) ABSTRACT

Disclosed is a mobile terminal having a main housing; a popup housing slidably movable on the main housing in a longitudinal direction to open or close an upper part of the main housing; and a lens housing connected to a rear of the main housing in such a manner that it can be pivoted around a rotating axis which is parallel to the sliding direction of the popup housing, the lens housing being opened or closed according to the sliding movement of the popup housing, and when the popup housing is moved up, the lens housing is capable of being pivoted around the rotating axis to expose a camera module facing in the same direction as a front side of the main housing. A picture may be taken through a through hole when the lens housing is closed by the popup housing. When the popup housing is moved up to expose the lens housing, the lens housing may be pivoted to take pictures in various directions.

11 Claims, 4 Drawing Sheets

HANDHELD MOBILE TERMINAL

PRIORITY

This application claims priority to an application entitled "Handheld Mobile Terminal" filed with the Korean Intellectual Property Office on May 3, 2004 and assigned Serial No. 2004-0031052, the contents of which are hereby incorporated by reference.

BACKGROUND OF THE INVENTION

1. Field of the Invention

The present invention relates to a handheld mobile terminal, and more particularly to a sliding-type mobile terminal with a second housing being slidable on a first housing in a longitudinal direction so as to open or close a display window of the first housing.

2. Description of the Related Art

Generally, mobile terminals are classified into a bar type, a flip type and a folder type according to their shapes.

A bar-type mobile terminal has a single housing provided with a data input/output means, a transmitter and a receiver. Since a keypad that serves as a data input/output means is always exposed, it is in a position in which it may be inadvertently pressed by a user in error or may cause an undesired function to take place. Also, there is a limitation in making bar-type mobile terminals smaller because a sufficient distance is needed between the transmitter and the receiver, which may not be met when the bar-type terminal is made too small.

A flip-type mobile terminal has a main housing, a flip and a hinge module that connects the flip to the main housing. The main housing is provided with a data input/output means, a transmitter and a receiver. Since the flip covers the data input/output means, i.e., the keypad, it can prevent any inadvertent key-pressings when the flip is closed. However, there is still a limitation in reducing the size of flip-type mobile terminals because of the need for a sufficient distance between the transmitter and the receiver.

A folder-type mobile terminal has a main housing, a folder and a hinge module that connects the folder rotatably to the main housing. In a call waiting mode with the folder closed, the keypad of the main housing is covered to prevent any inadvertent key-pressings. In a call mode with the folder opened and apart from the main housing, a sufficient distance is typically provided between the transmitter and the receiver. Accordingly, it is relatively easy to reduce the size of folder-type mobile terminals. Due to this advantage, folder-type mobile terminals have become more and more popular to due their smaller size.

With the increasing popularity of mobile terminals, and the increase in the number of people who use mobile terminals, a variety of designs have been suggested to meet the needs and tastes of users. Among such designs, a sliding type terminal in which one housing is slidable with respect to the other housing, a popup type terminal and a swing type have become commercially available.

Presently, a current trend in mobile terminals is to provide more integrated functions and services than previously available terminals, whereby telephone services now offer a variety of multimedia services, such as an MP3 player and a digital camera.

To have a digital camera function, a mobile terminal is provided with a built-in camera module and a window for exposing the camera module, which will affect the exterior design of the mobile terminal. Also, mobile terminals are now provided with built-in camera that swivel in order for the user to manipulate the direction of a camera lens during a video conference or to take photos. Recently, mobile terminals with over one million-pixel digital cameras have become available. Mobile terminals now also generally include additional means, such as a cover, for protecting a built-in digital camera while not being used. Unfortunately, such additional means make it difficult to design the mobile terminals to be smaller and lighter.

SUMMARY OF THE INVENTION

Accordingly, the present invention has been made to solve the above-mentioned problems occurring in the prior art, and one object of the present invention is to provide a handheld mobile terminal with a camera module capable of taking photos in various directions.

Another object of the present invention is to provide a small and lightweight mobile terminal with a camera module.

In order to accomplish the above objects of the present invention, there is provided a mobile terminal which includes a main housing; a popup housing slidably movable on the main housing in a longitudinal direction to open or close an upper part of the main housing; and a lens housing connected to a rear of the main housing in such a manner that it can be turned around a rotating axis which is parallel to a sliding direction of the popup housing, the lens housing being opened or closed according to the sliding movement of the popup housing, and when the popup housing is moved up, the lens housing is capable of being turned around the rotating axis to expose a camera module to face the same direction as a front side of the main housing.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
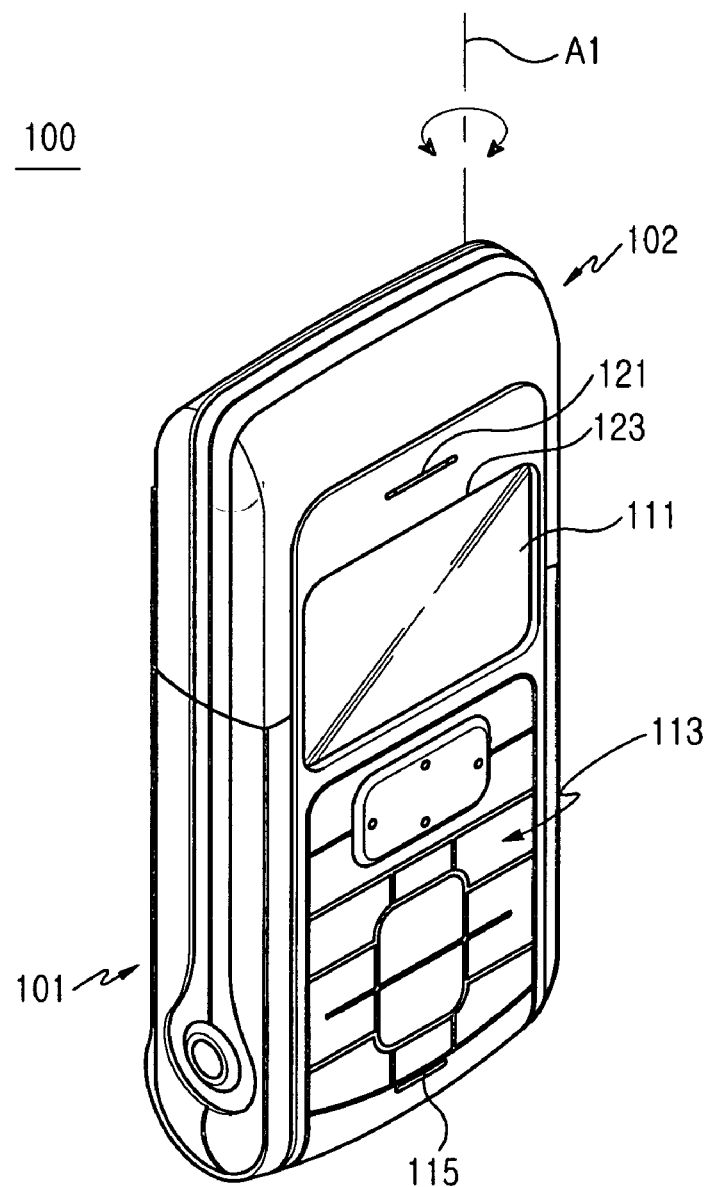
FIG. 1 is a perspective view of a handheld mobile terminal according to a preferred embodiment of the present invention.

Hereinafter, a preferred embodiment of the present invention will be described with reference to the accompanying drawings. In the drawings, the same elements, although depicted in different drawings, will be designated by the same reference numerals or characters. Also, in the following description of the present invention, a detailed description of known functions and configurations incorporated herein will be omitted when it may obscure the subject matter of the present invention.

As shown in FIGS. 1 to 4, the mobile terminal 100 according to the present invention comprises a main housing 101, a popup housing 102 and a lens housing 103.

The main housing 101 has a display device 111, a keypad 113 with a plurality of keys and a transmitter 115 with a built-in microphone on the front side thereof. The display device 111 provided on the front side of the main housing 101 displays information about received or transmitted data, date, time, amount of remaining battery power and so on. Also, the display device 101 displays pictures received during a video conference or that were photographed through a camera module. The keypad 113 is provided with number keys for inputting numbers or characters and function keys for selecting a menu, searching data or setting a mode of the mobile terminal. The number keys are preferably in a 3×4 key array layout. The function keys may include a send key, an end key, a menu key, a select key and navigation keys.

Figure 4:
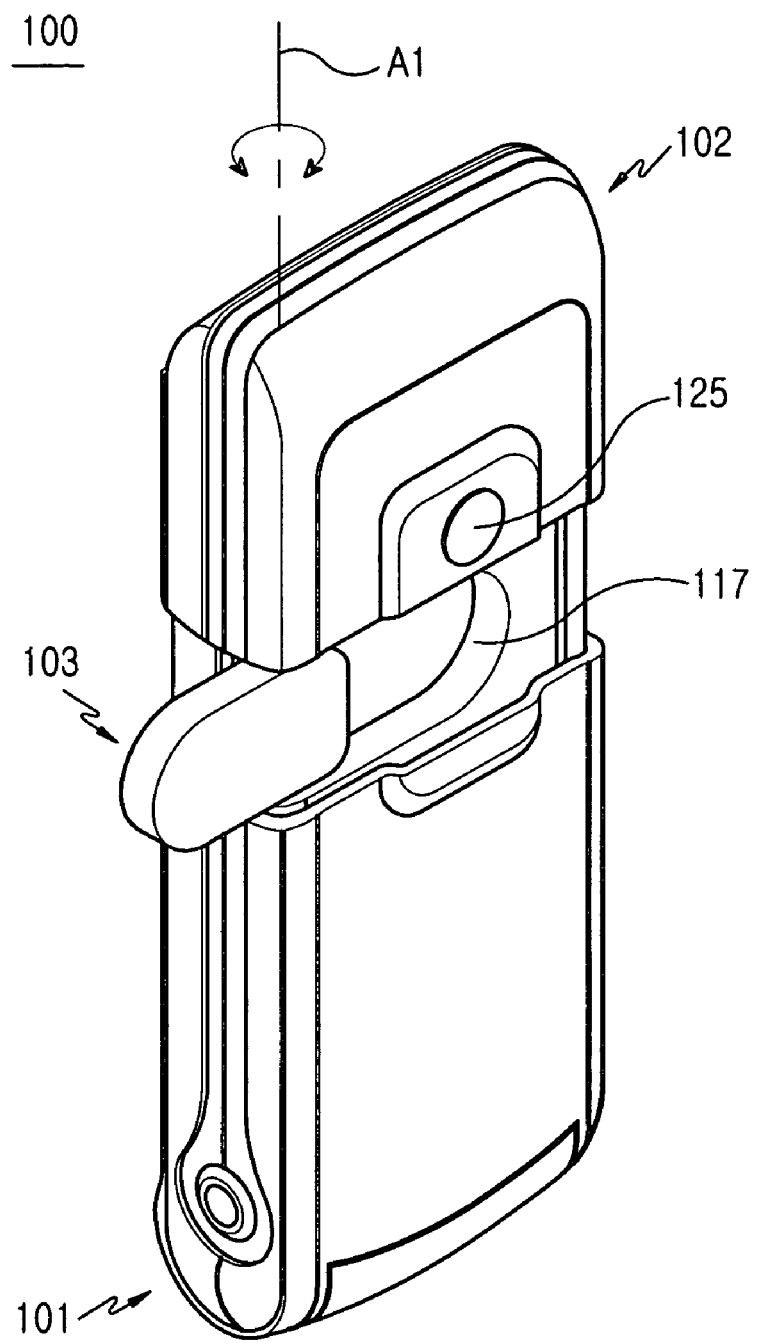
FIG. 4 is a rear view of the mobile terminal in FIG. 2.

As seen in FIG. 4, the main housing 101 has a receiving groove 117 for receiving the lens housing 103 on the rear side thereof. The receiving groove 117 extends from one lateral side of the main housing 101, extending toward the other lateral side in a predetermined length. Preferably, lens housing 103 has a complementary shape with respect to groove 117.

Figure 2:
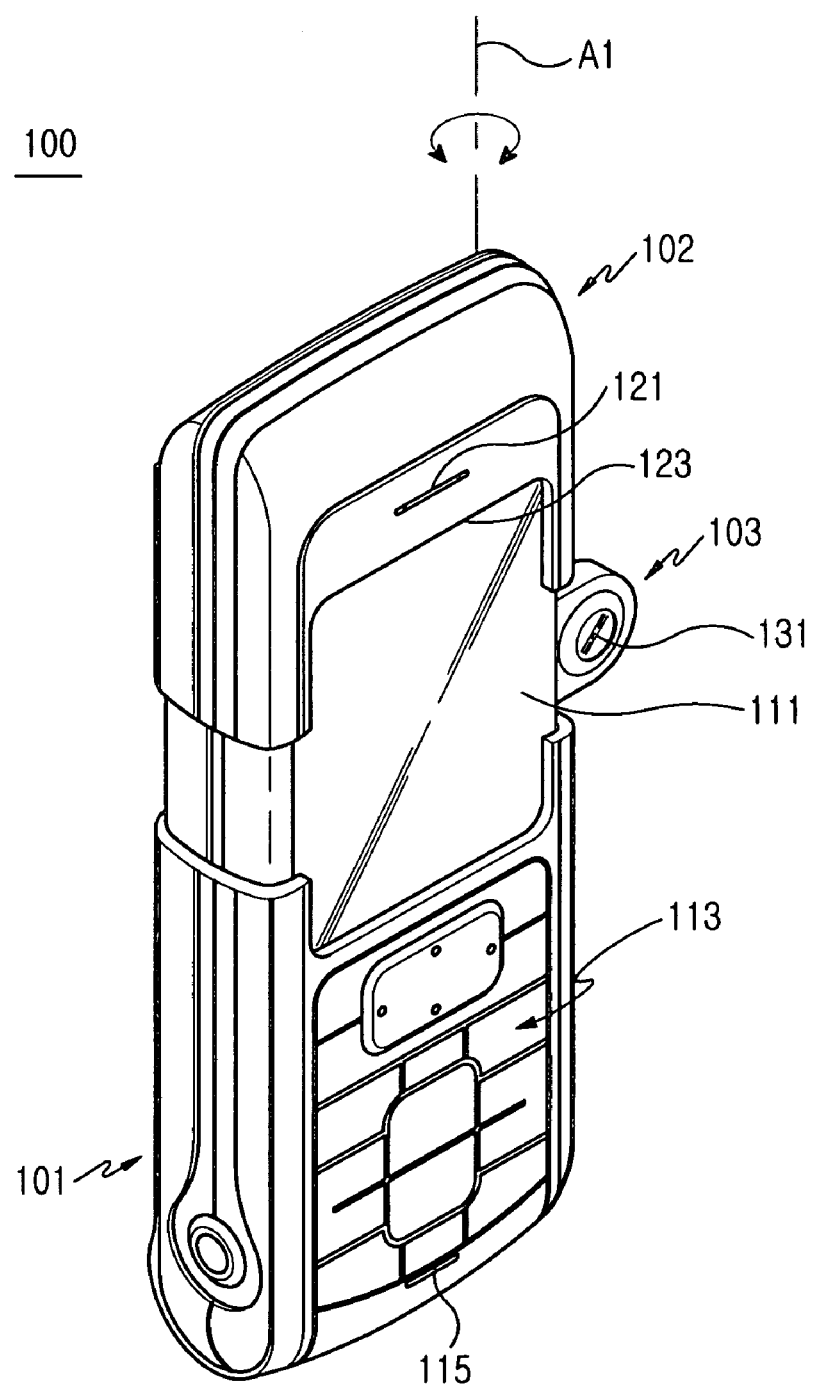
FIG. 2 is a perspective view of the mobile terminal in FIG. 1 with a lens housing projected outwardly.
Figure 3:
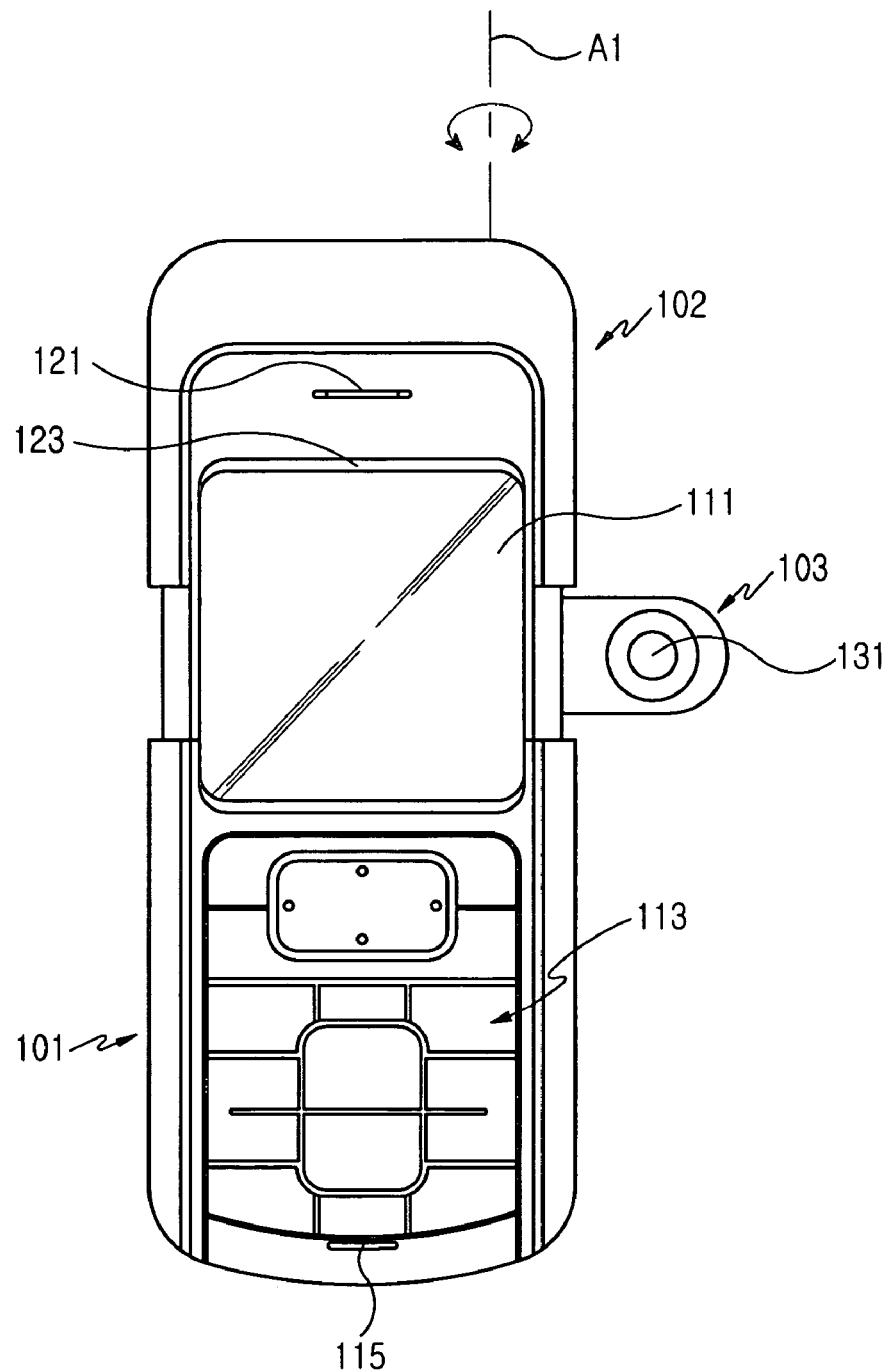
FIG. 3 is a front view of the mobile terminal in FIG. 2.

The popup housing 102 is connected to the main housing 101 in such a manner that it covers the upper part of the main housing 101 and slidably moves on the main housing in a longitudinal direction. Referring to FIGS. 1-3, The popup housing 102 has a receiver 121 with a built-in speaker and an opening 123 for exposing the display device 111. When the popup housing 102 is moved in a direction towards main housing 101, to completely cover the upper part of the main housing 101 as shown in FIG. 1, the display device 111 is partially exposed through the opening 123. When the popup housing 102 is moved away from main housing 101 as shown in FIG. 2, the entire display device 111 is exposed. At the same time, the receiving groove 117 on the rear side of the main housing 101 is covered or exposed according to the sliding movement of the popup housing 102. The receiving groove 117 is covered when the popup housing 102 is moved down as in FIG. 1 to completely cover the upper part of the main housing 101 and exposed when the popup housing 102 is moved up as in FIGS. 2-4.

Referring to FIG. 4, the popup housing 102 has a through hole 125 on the rear side thereof which overlays the receiving groove 117 when it is moved down to cover the upper part of the main housing 101 as in FIG. 1. The through hole 125 can be sealed by a transparent acrylic or glass cover, and aligns with the lens or window 131 of the lens housing 103.

The lens housing 103 is connected to one side edge on the rear of the main housing 101. The lens housing 103 can be pivoted around the rotating axis A defined by the longitudinal direction of the main housing 101. The rotating axis A is parallel to the sliding direction of the popup housing 102. The lens housing 103 can be pivoted to be placed within the receiving groove 117. When needed, the user can pivot the lens housing 103 to be projected from one side of the main housing 101 as shown in FIG. 3. The lens housing 103 has a lens or window 131 for exposing a camera module (not shown) on one side thereof. When the lens housing 103 is placed in the receiving groove 117 and covered by the popup housing 102, the through hole 125 of the popup housing 102 aligns with the window 131. Accordingly, the user can take pictures even when the lens housing 103 is covered by the popup housing 102.

When the lens housing 103 is received in the receiving groove 117, the user can take a picture while viewing an object on the display device 111. When the lens housing 103 is released from the receiving groove 117 and projected from one lateral side of the main housing 101 as in FIG. 3, the camera lens in the lens housing 103 is positioned in the same direction as the front side of the main housing 101 so that the user can take a picture of himself or participate in a video conference.

More specifically, the user can slide up the popup housing 102 to the position shown in FIGS. 2-4 and then selectively turn the lens housing 103 to be projected from one lateral side of the main housing 101 as shown in FIGS. 3 and 4. For general voice calls, text messages or information searches, the user may use the mobile terminal with the popup housing 102 moved up to completely expose the display device 111 of the main housing 101, with the lens housing 103 placed in the receiving groove 117. It is possible to take photos even when the lens housing 103 is placed in the receiving groove 117. In order to photograph in various directions or have a video conference, the user can pivot the lens housing 103 around the rotating axis A. The lens housing 103 may be provided with detents or ratchet type mechanism at several points along the path from FIG. 1 to FIG. 3. Therefore, it can be secured at any position on the path from FIG. 1 to FIG. 3. The lens housing 103 is released from the receiving groove 117 by user's pivoting force.

As described above, the mobile terminal according to the present invention enables the user to take a picture through the through hole when the lens housing is covered by the popup housing. When the popup housing is moved up to expose the lens housing, it is possible to turn the lens housing to take pictures in various directions. No separate cover is needed to protect the lens housing because the popup housing protects the lens housing including the camera module. Accordingly, the mobile terminal can be designed to be smaller and lighter.

Although a preferred embodiment of the present invention has been described for illustrative purposes, other embodiments are contemplated as well, such as positioning the lens housing and groove to extend along the longitudinal axis of the main housing, and being pivotable about an axis perpendicular to the main housing. In this embodiment, the popup housing is of such a length so as to substantially cover the main housing. Accordingly, those skilled in the art will appreciate that various modifications, additions and substitutions are possible, without departing from the scope and spirit of the invention as disclosed in the accompanying claims, including the full scope of equivalents thereof.

What is claimed is:

1. A handheld mobile terminal comprising:
a main housing having a receiving groove;
a popup housing slidably movable on the main housing in a longitudinal direction of the main housing to cover and to expose the receiving groove; and
a lens housing pivotably connected to the main housing about a rotating axis, the lens housing being received in the receiving groove and covered by the popup housing when the popup housing covers the receiving groove, the lens housing being pivotable about the rotating axis and being released from the receiving groove to project from a lateral side of the main housing when the popup housing exposes the receiving groove.

2. The handheld terminal according to claim 1, wherein when the popup housing is moved away from the main housing, the lens housing is pivotable around the rotating axis to expose a camera module to face a same direction as a front side of the main housing.

3. The handheld mobile terminal according to claim 1, wherein the lens housing has one end rotatably connected to one side edge on a rear side of the main housing.

4. The handheld mobile terminal according to claim 1, wherein a display device is provided on a front side of the main housing and the lens housing is positioned behind the display device when received in the main housing and positioned adjacent to the display device when pivoted to project from the lateral side of the main housing.

5. The handheld mobile terminal according to claim 1, wherein the receiving groove is located on a rear side of the main housing and having a shape complementary to the lens housing.

6. The handheld mobile terminal according to claim 1, wherein the popup housing includes a through hole for exposing a camera lens in the lens housing when the lens housing is covered by the popup housing.

7. The handheld mobile terminal according to claim 6 wherein the lens housing includes an exposure window that can be exposed through the through hole.

8. The handheld mobile terminal according to claim 6, wherein the through hole is sealed by a transparent cover.

9. The handheld mobile terminal according to claim 1, wherein a display device is disposed on a front side of the main housing and is partially exposed or fully exposed according to the sliding movement of the popup housing.

10. The handheld mobile terminal according to claim 9, wherein the popup housing includes an opening for exposing the display device.

11. The handheld mobile terminal according to claim 1, wherein the main housing includes a keypad with a plurality of keys and a transmitter at a lower end of the keypad, and the popup housing includes a receiver on one side thereof.

* * * * *